(12) United States Patent
Morgia et al.

(10) Patent No.: US 8,494,436 B2
(45) Date of Patent: Jul. 23, 2013

(54) SYSTEM AND METHOD FOR ALGORITHMIC SELECTION OF A CONSENSUS FROM A PLURALITY OF IDEAS

(75) Inventors: Michael A. Morgia, Watertown, NY (US); Pat A. Fontana, Jr., Watertown, NY (US); Alex M. Morgia, Watertown, NY (US); Pat A. Fontana, Sr., Watertown, NY (US); Ralph E. Roland, Ellicott City, MD (US); Shawn M. Davis, Clarksville, MD (US); Mark M. Piwowarski, Ellicott City, MD (US); John P. Gaus, Watertown, NY (US)

(73) Assignee: Watertown Software, Inc., Watertown, NY (US)

( * ) Notice: Subject to any disclaimer, the term of this patent is extended or adjusted under 35 U.S.C. 154(b) by 922 days.

(21) Appl. No.: 12/473,598

(22) Filed: May 28, 2009

(65) Prior Publication Data

US 2009/0239205 A1   Sep. 24, 2009

Related U.S. Application Data

(63) Continuation-in-part of application No. 11/934,990, filed on Nov. 5, 2007, now abandoned.

(60) Provisional application No. 60/866,099, filed on Nov. 16, 2006, provisional application No. 60/981,234, filed on Oct. 19, 2007.

(51) Int. Cl.
*G09B 3/00* (2006.01)

(52) U.S. Cl.
USPC ............................ 434/350; 434/322; 434/323

(58) Field of Classification Search
USPC .................................. 434/322, 323, 350, 362
See application file for complete search history.

(56) References Cited

U.S. PATENT DOCUMENTS

| | | | |
|---|---|---|---|
| 5,034,902 A | 7/1991 | Steinmann |
| 5,193,058 A | 3/1993 | Bassili et al. |
| 5,528,670 A | 6/1996 | Elliot et al. |
| 5,587,935 A | 12/1996 | Brooks et al. |
| 5,870,730 A | 2/1999 | Furuya et al. |
| 5,893,075 A | 4/1999 | Plainfield et al. |
| 5,893,098 A | 4/1999 | Peters et al. |
| 6,047,288 A | 4/2000 | Kurosawa et al. |

(Continued)

OTHER PUBLICATIONS

Frank Chu, Notes on the Mian-Chowla Sequence, Jun. 2004.

*Primary Examiner* — Bruk Gebremichael
(74) *Attorney, Agent, or Firm* — Altera Law Group, LLC

(57) ABSTRACT

A system and method for algorithmic selection of a consensus from a collection of ideas is disclosed. A group of ideas is provided to a group of participants for voting. Voting may occur in a single round or in several successive rounds, optionally until a consensus idea is chosen. Typically, the votes that are cast use discrete levels, such as "approve", "disapprove", "positive", "neutral" or "negative". For ideas that receive the same votes, a differentiator may be the time spent casting the vote. A relatively long evaluation time may signal some internal conflict in the mind of the participant, when compared with a relatively short evaluation time, which may signal no such conflict. The evaluation time may be combined with the rating of the participant to form a weighted rating. Consequently, a short evaluation time of a positive rating may yield a more positive weighted rating, while a short evaluation time of a negative rating may yield a more negative weighted rating.

15 Claims, 8 Drawing Sheets

U.S. PATENT DOCUMENTS

| | | | |
|---|---|---|---|
| 6,066,265 | A | 5/2000 | Galvin et al. |
| 6,154,739 | A | 11/2000 | Wrobel |
| 6,324,266 | B1 | 11/2001 | Mannings |
| 6,338,086 | B1 | 1/2002 | Curtis et al. |
| 6,446,113 | B1 | 9/2002 | Ozzie et al. |
| 6,457,045 | B1 | 9/2002 | Hanson et al. |
| 6,463,461 | B1 | 10/2002 | Hanson et al. |
| 6,484,196 | B1 | 11/2002 | Maurille |
| 6,505,242 | B2 | 1/2003 | Holland et al. |
| 6,598,163 | B1 | 7/2003 | Jakobsson |
| 6,775,518 | B2 | 8/2004 | Norcott et al. |
| 6,792,244 | B2 | 9/2004 | Ross et al. |
| 6,792,448 | B1 | 9/2004 | Smith |
| 6,829,487 | B2 | 12/2004 | Eiden et al. |
| 6,947,924 | B2 | 9/2005 | Bates et al. |
| 7,092,821 | B2 | 8/2006 | Mizrahi et al. |
| 7,158,960 | B2 | 1/2007 | Ferguson et al. |
| 7,433,832 | B1 * | 10/2008 | Bezos et al. ................. 705/26.8 |
| 7,519,562 | B1 | 4/2009 | Vander Mey et al. |
| 2001/0047290 | A1 * | 11/2001 | Petras et al. .................... 705/10 |
| 2002/0016733 | A1 | 2/2002 | Ito |
| 2002/0029350 | A1 | 3/2002 | Cooper et al. |
| 2002/0072955 | A1 | 6/2002 | Brock |
| 2002/0077839 | A1 | 6/2002 | Siegel et al. |
| 2002/0077881 | A1 | 6/2002 | Krotki |
| 2002/0095305 | A1 | 7/2002 | Gakidis et al. |
| 2002/0194054 | A1 | 12/2002 | Frengut |
| 2003/0028607 | A1 | 2/2003 | Miller et al. |
| 2003/0036947 | A1 | 2/2003 | Smith et al. |
| 2003/0088458 | A1 | 5/2003 | Afeyan et al. |
| 2003/0200137 | A1 | 10/2003 | Drummond |
| 2003/0225652 | A1 | 12/2003 | Minow et al. |
| 2004/0073476 | A1 | 4/2004 | Donahue et al. |
| 2004/0091093 | A1 | 5/2004 | Bookstaff |
| 2004/0093259 | A1 | 5/2004 | Pych |
| 2004/0103032 | A1 | 5/2004 | Maggio |
| 2004/0133429 | A1 | 7/2004 | Runyan |
| 2004/0162751 | A1 * | 8/2004 | Tsyganskiy et al. ............ 705/10 |
| 2004/0165006 | A1 | 8/2004 | Kirby et al. |
| 2004/0225577 | A1 * | 11/2004 | Robinson ........................ 705/26 |
| 2004/0236625 | A1 | 11/2004 | Kearon |
| 2004/0267604 | A1 | 12/2004 | Gross |
| 2005/0003338 | A1 | 1/2005 | Norcott et al. |
| 2005/0009465 | A1 | 1/2005 | Ross et al. |
| 2005/0010313 | A1 | 1/2005 | Mori |
| 2005/0033630 | A1 | 2/2005 | Kowalchuk |
| 2005/0033710 | A1 * | 2/2005 | Cochran et al. ................. 706/45 |
| 2005/0033807 | A1 | 2/2005 | Lowrance et al. |
| 2005/0060232 | A1 | 3/2005 | Maggio |
| 2005/0067493 | A1 | 3/2005 | Urken |
| 2005/0102534 | A1 | 5/2005 | Wong |
| 2005/0149609 | A1 | 7/2005 | Lamport |
| 2005/0216329 | A1 * | 9/2005 | Handy-Bosma et al. ....... 705/10 |
| 2005/0251499 | A1 * | 11/2005 | Huang ............................. 707/1 |
| 2005/0261953 | A1 | 11/2005 | Malek et al. |
| 2005/0278212 | A1 | 12/2005 | Fan et al. |
| 2006/0004621 | A1 | 1/2006 | Malek et al. |
| 2006/0015393 | A1 | 1/2006 | Eisma et al. |
| 2006/0031115 | A1 | 2/2006 | Eisma et al. |
| 2006/0069546 | A1 | 3/2006 | Rosser et al. |
| 2006/0074775 | A1 | 4/2006 | Roman et al. |
| 2006/0100917 | A1 | 5/2006 | Macy et al. |
| 2006/0100918 | A1 | 5/2006 | Macy et al. |
| 2006/0100945 | A1 | 5/2006 | Macy et al. |
| 2006/0129458 | A1 | 6/2006 | Maggio |
| 2006/0143069 | A1 | 6/2006 | Graves et al. |
| 2006/0288072 | A1 * | 12/2006 | Knapp et al. .................. 709/203 |
| 2007/0016468 | A1 | 1/2007 | Campbell et al. |
| 2007/0043718 | A1 * | 2/2007 | Arellanes et al. ................. 707/5 |
| 2007/0256093 | A1 * | 11/2007 | Hiler .............................. 725/28 |
| 2007/0282874 | A1 * | 12/2007 | Metcalfe ....................... 707/101 |
| 2008/0000970 | A1 | 1/2008 | Savage et al. |
| 2008/0027792 | A1 | 1/2008 | Wu |
| 2008/0059308 | A1 | 3/2008 | Gerken |
| 2009/0138472 | A1 * | 5/2009 | MacLean .......................... 707/7 |

* cited by examiner

| Participant ID | Idea numbers, pre-randomization | | | | | | | | |
|---|---|---|---|---|---|---|---|---|---|
| #1 | 1 | 2 | 4 | 8 | 13 | 21 | 31 | 45 | 66 | 81 |
| #2 | 2 | 3 | 5 | 9 | 14 | 22 | 32 | 46 | 67 | 82 |
| #3 | 3 | 4 | 6 | 10 | 15 | 23 | 33 | 47 | 68 | 83 |
| #4 | 4 | 5 | 7 | 11 | 16 | 24 | 34 | 48 | 69 | 84 |
| #5 | 5 | 6 | 8 | 12 | 17 | 25 | 35 | 49 | 70 | 85 |
| #6 | 6 | 7 | 9 | 13 | 18 | 26 | 36 | 50 | 71 | 86 |
| #7 | 7 | 8 | 10 | 14 | 19 | 27 | 37 | 51 | 72 | 87 |

Fig. 2

| Participant ID | Idea numbers, post-randomization | | | | | | | | | Local winner |
|---|---|---|---|---|---|---|---|---|---|---|
| #1 | 771 | 953 | 773 | 551 | 97 | 739 | 817 | 302 | 648 | 673 | 953 |
| #2 | 953 | 983 | 599 | 404 | 689 | 890 | 6 | 844 | 790 | 869 | 983 |
| #3 | 983 | 773 | 183 | 501 | 130 | 981 | 929 | 430 | 447 | 271 | 983 |
| #4 | 773 | 599 | 458 | 161 | 567 | 616 | 110 | 968 | 568 | 431 | 968 |
| #5 | 599 | 183 | 551 | 547 | 452 | 421 | 916 | 549 | 206 | 74 | 916 |
| #6 | 183 | 458 | 404 | 97 | 86 | 637 | 803 | 888 | 723 | 624 | 888 |
| #7 | 458 | 551 | 501 | 689 | 587 | 834 | 702 | 512 | 471 | 212 | 834 |

Fig. 3

| Hurdle ALL | 40% Winning % |
|---|---|
| 1000 | 100.0% |
| 999 | 100.0% |
| 998 | 100.0% |
| 997 | 100.0% |
| 996 | 90.0% |
| 995 | 100.0% |
| 994 | 90.0% |
| 993 | 100.0% |
| 992 | 100.0% |
| 991 | 100.0% |
| 990 | 100.0% |
| 989 | 90.0% |
| 988 | 80.0% |
| 987 | 100.0% |
| 986 | 90.0% |
| 985 | 90.0% |
| 984 | 70.0% |
| Artificial Break | for convenience |
| 916 | 40.0% |
| 915 | 60.0% |
| 914 | 30% |
| 913 | 60.0% |
| 912 | 50.0% |
| 911 | 50.0% |
| 910 | 60.0% |
| 909 | 30.0% |
| 908 | 30.0% |
| 907 | 20.0% |
| 906 | 20.0% |
| 905 | 20.0% |
| 904 | 50.0% |
| 903 | 40.0% |
| 902 | 20.0% |

Fig. 4

| Stats | |
|---|---|
| Accuracy | Best 8.60% |
| Top | Found 86 |
| Best Miss | 914 |
| Worst Survivor | 813 |
| Survivors # | 118 |
| Survivors % | 11.80% |

Perfection Ratio best/survivor    72.88%

Purity Ratio    62.77%

Fig. 5

Hurdle    36%

| ALL | Winning % | Survivors | Purged |
|---|---|---|---|
| 1000 | 91.3% | 1000 | |
| 999 | 78.8% | 999 | |
| 998 | 77.5% | 998 | |
| 997 | 71.3% | 997 | |
| 996 | 61.3% | 996 | |
| 995 | 67.5% | 995 | |
| 994 | 58.8% | 994 | |
| 993 | 42.5% | 993 | |
| 992 | 42.5% | 992 | |
| 991 | 41.3% | 991 | |
| 990 | 46.3% | 990 | |
| 989 | 35.0% | | 989 |
| 988 | 27.5% | | 988 |
| 987 | 26.3% | | 987 |
| 986 | 23.8% | | 986 |
| 985 | 15.0% | | 985 |
| 984 | 17.5% | | 984 |

Fig. 6

| Number of ideas per group, $n$ | Mian Chowla number, $a_n$ | Minimum number of participants or ideas, $p$, = $2a_n - 1$ |
|---|---|---|
| 1 | 1 | 1 |
| 2 | 2 | 3 |
| 3 | 4 | 7 |
| 4 | 8 | 15 |
| 5 | 13 | 25 |
| 6 | 21 | 41 |
| 7 | 31 | 61 |
| 8 | 45 | 89 |
| 9 | 66 | 131 |
| 10 | 81 | 161 |
| 11 | 97 | 193 |
| 12 | 123 | 245 |
| 13 | 148 | 295 |
| 14 | 182 | 363 |

Fig. 7

| Participant number | Idea numbers | | | | | | | |
|---|---|---|---|---|---|---|---|---|
| 1 | 1 | 2 | 4 | 8 | 13 | 21 | 31 | 45 |
| 2 | 2 | 3 | 5 | 9 | 14 | 22 | 32 | 46 |
| 3 | 3 | 4 | 6 | 10 | 15 | 23 | 33 | 47 |
| 4 | 4 | 5 | 7 | 11 | 16 | 24 | 34 | 48 |
| ... | | | | ... | | | | |
| 88 | 88 | 89 | 91 | 95 | 100 | 8 | 18 | 32 |
| 89 | 89 | 90 | 92 | 96 | 1 | 9 | 19 | 33 |
| 90 | 90 | 91 | 93 | 97 | 2 | 10 | 20 | 34 |
| 91 | 91 | 92 | 94 | 98 | 3 | 11 | 21 | 35 |
| 92 | 92 | 93 | 95 | 99 | 4 | 12 | 22 | 36 |
| 93 | 93 | 94 | 96 | 100 | 5 | 13 | 23 | 37 |
| 94 | 94 | 95 | 97 | 1 | 6 | 14 | 24 | 38 |
| 95 | 95 | 96 | 98 | 2 | 7 | 15 | 25 | 39 |
| 96 | 96 | 97 | 99 | 3 | 8 | 16 | 26 | 40 |
| 97 | 97 | 98 | 100 | 4 | 9 | 17 | 27 | 41 |
| 98 | 98 | 99 | 1 | 5 | 10 | 18 | 28 | 42 |
| 99 | 99 | 100 | 2 | 6 | 11 | 19 | 29 | 43 |
| 100 | 100 | 1 | 3 | 7 | 12 | 20 | 30 | 44 |

Fig. 8

| Participant number | Template 1 Idea numbers | | | Template 2 Idea numbers | | | Template 3 Idea numbers | | |
|---|---|---|---|---|---|---|---|---|---|
| 1 | 1 | 2 | 4 | 11 | 12 | 14 | 21 | 22 | 24 |
| 2 | 2 | 3 | 5 | 12 | 13 | 15 | 22 | 23 | 25 |
| 3 | 3 | 4 | 6 | 13 | 14 | 16 | 23 | 24 | 26 |
| 4 | 4 | 5 | 7 | 14 | 15 | 17 | 24 | 25 | 27 |
| 5 | 5 | 6 | 8 | 15 | 16 | 18 | 25 | 26 | 28 |
| 6 | 6 | 7 | 9 | 16 | 17 | 19 | 26 | 27 | 29 |
| 7 | 7 | 8 | 10 | 17 | 18 | 20 | 27 | 28 | 30 |
| 8 | 8 | 9 | 1 | 18 | 19 | 11 | 28 | 29 | 21 |
| 9 | 9 | 10 | 2 | 19 | 20 | 12 | 29 | 30 | 22 |
| 10 | 10 | 1 | 3 | 20 | 11 | 13 | 30 | 21 | 23 |

Fig. 9

| Winners | % Wins | Next Higher Score | Tough comps | Below's TCs | diff | New score | Below's Win % | Switch w/ below? |
|---|---|---|---|---|---|---|---|---|
| 1000 | 100.0% | | | | | | | |
| 999 | 96.3% | | | | | | | |
| 998 | 86.3% | 96.3% | 13.8% | 15.0% | -1.3% | 84.57% | 76.3% | |
| 997 | 76.3% | 86.3% | 23.8% | 17.5% | 6.3% | 84.96% | 76.3% | |
| 996 | 76.3% | 86.3% | 17.5% | 21.3% | -3.8% | 71.02% | 67.5% | |
| 994 | 67.5% | 76.3% | 28.8% | 35.0% | -6.3% | 58.82% | 65.0% | switch |
| 995 | 65.0% | 67.5% | 38.8% | 30.0% | 8.8% | 74.76% | 66.3% | |
| 993 | 66.3% | 67.5% | 30.0% | 31.3% | -1.3% | 64.93% | 56.3% | |
| 992 | 56.3% | 65.0% | 43.8% | 42.5% | 1.3% | 58.08% | 55.0% | |
| 991 | 55.0% | 56.3% | 45.0% | 48.8% | -3.8% | 50.99% | 47.5% | |
| 990 | 47.5% | 55.0% | 52.5% | 53.8% | -1.3% | 45.66% | 38.8% | |
| 988 | 38.8% | 47.5% | 57.5% | 63.8% | -6.3% | 28.27% | 36.3% | switch |
| 989 | 36.3% | 47.5% | 63.8% | 51.3% | 12.5% | 60.39% | 38.8% | |
| 986 | 38.8% | 47.5% | 51.3% | 60.0% | -8.8% | 24.07% | 35.0% | switch |
| 987 | 35.0% | 36.3% | 68.8% | 72.5% | -3.8% | 30.85% | 26.3% | |
| 985 | 26.3% | 35.0% | 73.8% | 66.3% | 7.5% | 41.25% | 28.8% | |

Fig. 10

| Participant Rating | Participant Evaluation Time | Weighted Rating |
|---|---|---|
| Positive | Short | +3 |
| Positive | Medium | +2.5 |
| Positive | Long | +2 |
| Neutral | Short | +1.75 |
| Neutral | Medium | +1.5 |
| Neutral | Long | +1 |
| Negative | Long | −1 |
| Negative | Medium | −1.5 |
| Negative | Short | −2 |

Fig. 11

SYSTEM AND METHOD FOR ALGORITHMIC SELECTION OF A CONSENSUS FROM A PLURALITY OF IDEAS

CROSS-REFERENCE TO RELATED APPLICATIONS

This application is a continuation-in-part of prior application Ser. No. 11/934,990, filed on Nov. 5, 2007 now abandoned, under the title, "Selection Of A Consensus From A Plurality Of Ideas" and published on Oct. 16, 2008 as United States Patent Application Publication No. 20080254436, which claimed priority under 35 U.S.C §119(e) to provisional application No. 60/866,099, filed on Nov. 16, 2006, under the title, "Software to group people and ideas", and to provisional application No. 60/981,234, filed on Oct. 19, 2007, under the title, "Selection of a consensus from a plurality of ideas". Full Paris Convention priority is hereby expressly reserved.

BACKGROUND OF THE INVENTION

1. Field of the Invention

The present invention is directed to a system and method of selection of a consensus from a collection of ideas.

2. Background

Fundamentally, it is hard for a useful consensus to be extracted from a group. There are many instances in which a collection of people needs to reach a consensus regarding a particular issue. The issue may be anything that can be voted on, such as a candidate to be chosen from among a group of candidates, or a pressing issue that needs to be put forth by the group in a representative manner. For very small groups of people, this may be relatively straightforward, and may result from a dialogue among the people within the small group.

However, for groups larger than about ten people, finding a consensus becomes much more difficult. Direct discussion among the group members becomes unwieldy and awkward, and an exchange of ideas that may be simple in a group of five people becomes onerous for a group of 100. In addition, even in small group, the majority of the discussion may be lead by a relatively small number of participants.

Accordingly, there exists a need for a method of selecting an idea or forming a consensus, which works for both large and small groups of people.

BRIEF SUMMARY OF THE INVENTION

An embodiment is a computer program product, comprising a computer usable medium having a computer readable program code embodied therein, said computer readable program code adapted to be executed to implement a method for rating a plurality of ideas, said method comprising: distributing the plurality of ideas to a group of participants; collecting from each participant a rating for each idea; recording an evaluation time for each participant and each idea; and forming a weighted rating from each rating and each corresponding evaluation time.

Another embodiment is a computer program product, comprising a computer usable medium having a computer readable program code embodied therein, said computer readable program code adapted to be executed to implement a method for rating a plurality of ideas, said method comprising: distributing a first plurality of ideas to a group of participants; collecting from each participant a first rating for each idea in the first plurality; selecting a first winning idea from the first plurality in response to the first ratings; collecting a first approval rating from each participant in response to the first winning idea; distributing a second plurality of ideas to the group of participants; collecting from each participant a second rating for each idea in the second plurality; selecting a second winning idea from the second plurality in response to the second ratings; collecting a second approval rating from each participant in response to the second winning idea; determining a third plurality of ideas in response to the first and second approval ratings; distributing a third plurality of ideas to the group of participants; collecting from each participant a third rating for each idea in the third plurality; and selecting a third winning idea from the third plurality in response to the third ratings.

BRIEF DESCRIPTION OF THE SEVERAL VIEWS OF THE DRAWINGS

FIG. 2 is an exemplary template.

FIG. 3 is the exemplary template of FIG. 2, after randomization of the idea numbers, with voting results.

FIG. 4 is a tabular summary of exemplary first-round voting results.

FIG. 5 is a numerical summary of the results of FIG. 4.

FIG. 6 is a tabular summary of exemplary second-round voting results.

FIG. 7 is a numerical relationship between the number of participants and the number of ideas per group.

FIG. 8 is an exemplary template for 100 participants, 100 ideas and 8 ideas per group.

FIG. 9 is an exemplary stitched template for 10 participants, 30 ideas, and 9 ideas per group.

FIG. 10 is tabular summary of an exemplary tough competition calculation.

FIG. 11 is an exemplary table of weighted ratings versus participant ratings and corresponding evaluation times.

DETAILED DESCRIPTION OF THE INVENTION

The present application discloses a computer system and algorithmic methods for selecting a consensus or a group of preferred ideas from a group of participants or respondents. While much of the description explains the methodology of this invention, the invention is best practiced when encoded into a software-based system for carrying out this methodology. This disclosure includes a plurality of method steps which are in effect flow charts to the software implementation thereof. This implementation may draw upon some or all of the steps provided herein.

The participants may vote on a set of ideas that are provided to the participants, or may themselves generate a set of responses to a question, or may even generate the question itself. The ideas may include anything that can be chosen or voted on, including but not limited to, words, pictures, video, music, and so forth.

The participants repeatedly go through the process of rating a subset of ideas and keeping the highest-rated of all the ideas, until the subset is reduced to a targeted number, or optionally repeated until only a single idea remains. The last remaining idea represents the consensus of the group of participants. There are several specific aspects that pertain to this selection method, several of which are briefly summarized in the following paragraphs.

One specific aspect is that the first time the ideas are divided into groups, the group may explicitly exclude the idea that is generated by the participant, so that the participant is not put in a position where he/she may compare his/her own idea to those generated by other participants.

Another aspect is that the first time the ideas are divided into groups, the groups may be formed so that no two ideas are included together in more than one group. In other words, a particular idea competes against another particular idea no more than once in the initial round of rating.

Another aspect is that the participants may rate their respective groups of ideas by ranking, such as by picking their first choice, or by picking their first and second choices, or by picking their first, second and third choices. They may also vote in a negative manner, but choosing their least favorite idea or ideas from the group.

Another aspect is that for each round of rating, there may be a threshold rating level that may optionally be adjusted for competition that is too difficult and/or too easy.

Another aspect is that a particular participant that votes against the consensus, such as a saboteur or other evil-doer, may have his/her votes discounted. This aspect, as well as the other aspects summarized above, is described in greater detail in the remainder of this document.

Figure 1:
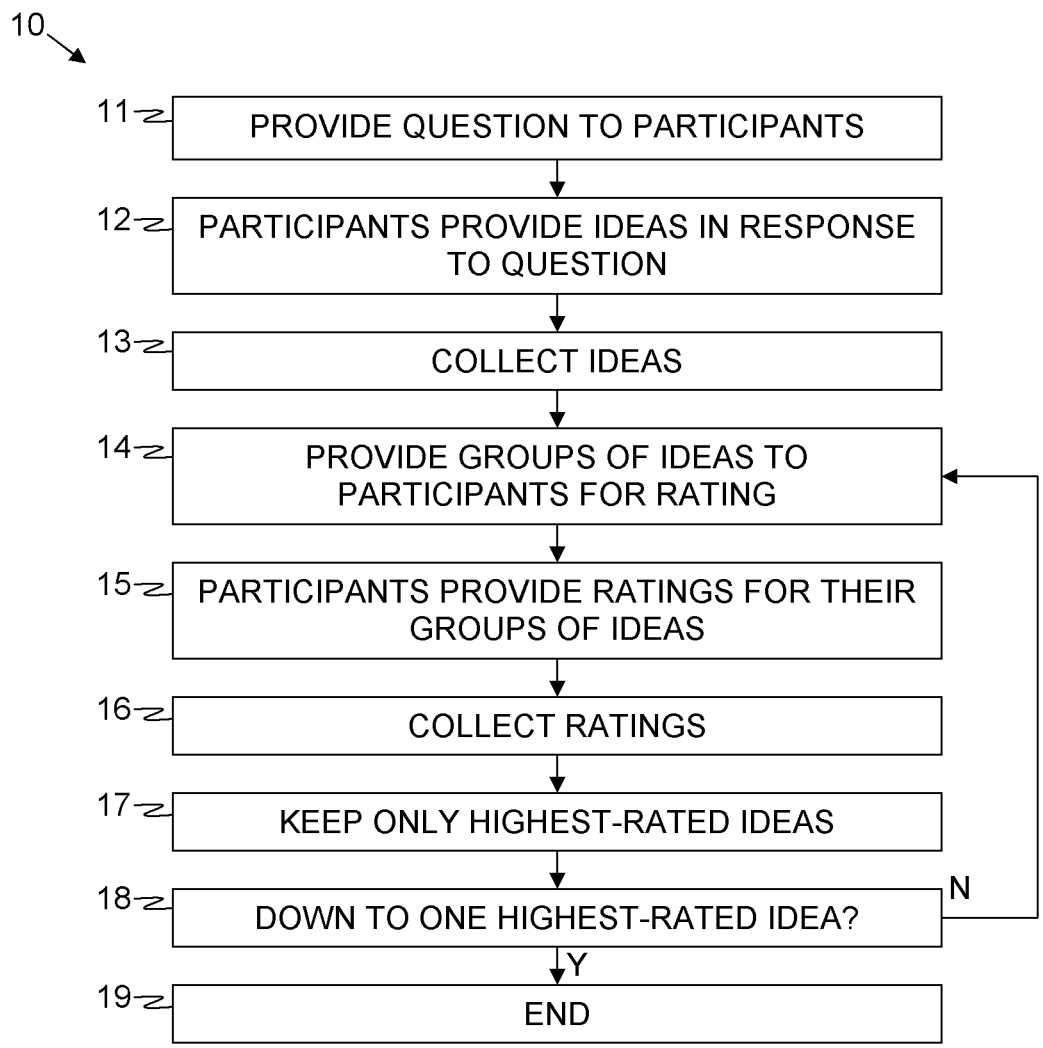
FIG. 1 is a flowchart of a consensus selection process.

A flowchart of some of the basic elements of the method 10 for selecting a consensus is shown in FIG. 1.

In element 11, a question may be provided to a group of participants or respondents. The question may be multiple-choice, or may alternately be open-ended.

In element 12, the participants provide their respective responses to the question of element 11, which may be referred to as "ideas". Their answers may be selected from a list, as in a multiple-choice vote or a political election, or may be open-ended, with a wording and/or content initiated by each respective participant.

In element 13, the ideas generated in element 12 are collected.

In element 14, the ideas collected in element 13 are parsed into various groups or sets, with a group corresponding to each participant, and the groups are distributed to their respective participants. The groups may be overlapping (i.e., non-exclusive) subsets of the full collection of ideas. In some embodiments, each group explicitly excludes the idea generated by the particular participant, so that the participant cannot rate his/her own idea directly against those generated by other participants. In some embodiments, each group is unique, so that no two groups contain exactly the same ideas. In some embodiments, the groups are parsed so that no two ideas appear together in more than one group. In some embodiments, the number of ideas per group is equal to the number of times a particular idea appears in a group. The mathematics of the group parsing is provided in greater detail below.

In element 15, the participants rate the ideas in their respective groups. In some embodiments, the ratings include a ranking of some or all of the groups. In some embodiments, the ratings include selecting a first choice from the ideas in the group. In some embodiments, the ratings include selecting a first and second choice. In some embodiments, the ratings include selecting a first, second and third choice.

In element 16, the ratings from or all or most of the participants are collected and tallied. In some embodiments, each idea is given a score, based on the average rating for each group in which the idea appears. The mathematics of the ratings tallying is provided in greater detail below.

In element 17, the highest-rated ideas are kept in consideration, and may be re-parsed into new groups and re-distributed to the participants for further competition. The lower-rated ideas are not considered for further competition. The cutoff may be based on a rating threshold, where ideas scoring higher than the threshold are kept and ideas scoring less than the threshold are discarded. In some embodiments, the threshold may be absolute. In some embodiments, the threshold may be relative, based on the relative strength of the ideas in competition. In some embodiments, the thresholds may be adjusted based on the relative strength of the competition. The mathematics behind these threshold aspects is provided in greater detail below.

In element 18, if only one idea is kept from element 17, then that idea is the consensus and we are finished, so we proceed to element 19 and stop. If more than one idea is kept from element 18, then we return to element 14 and continue.

In some embodiments, the elements 11-19 in method 10 are carried out by software implemented on one or more computers or servers. Alternatively, the elements may be performed by any other suitable mechanism.

At this point, it is worthwhile to describe an example, with mathematical discussions following the example.

In this example, a company asks a crowd of 1000 customers to give advice on "what our customers want". As incentive, the company will give product coupons to all participants and will give larger prizes and/or cash for the best ideas. The participation will be through a particular website that is configured to deliver and receive information from the participants. The website is connected to a particular server that manages the associated data.

In this example, "what our customers want" is analogous to the question of element 11 in FIG. 1.

Each participant types in an idea on the website. This is analogous with elements 12 and 13 in FIG. 1.

The server randomly mixes and parses the ideas for peer review. Each participant is randomly sent 10 ideas to rate through the website. For this example, each idea is viewed by 10 other users, but compared to 90 other ideas. This is analogous with element 14 in FIG. 1.

In this example, there are two constraints on random mixing and parsing of the ideas. First, the participant's own idea is not sent to the participant, so that the participant does not have the opportunity to rate his/her own idea. Second, no idea is paired with any other idea more than once. This avoids the potential for a particularly good idea being eliminated by repeatedly being paired with one or more extremely good ideas, while a mediocre idea is passed along by being luckily paired with 9 bad ideas.

Each participant views the 10 ideas from other participants on the website, and chooses the one that he/she most agrees with. The participant's selection is also performed through the website. This is analogous with elements 15 and 16 in FIG. 1.

The company specifies a so-called "hurdle rate" for this round of voting, such as 40%. If a particular idea wins 40% or more of the 10 distinct competitive sets that include it, then it is passed on to the next round of competition. If the particular idea does not win more than 40%, it is excluded from further competition and does not pass on to the next round of competition. Note that the company may also specify a certain desired number of ideas (say, top 100) or percentage of ideas (say, top 10%) to move on to the next round, rather than an absolute hurdle rate (40%). Note that the hurdle rate may be specified by the operator of the website, or any suitable sponsor of the competition. The server tallies the selections from the participants, and keeps only the highest-rated ideas. This is analogous with element 17 in FIG. 1.

For this example, we assume that the server keeps the top 100 ideas for the next round of competition. The server re-randomizes and parses the 100 ideas into sets of 8 this time, rather than the set of 10 from the first round of competition.

Each idea is seen by 80 participants in this round, compared to 10 in the initial round. In this round, each idea may be in competition with another particular idea more than once, but never more than 8 times in the 80 competitions. The probability of multiple pairings decreases with an increasing number of pairings, so that having two particular ideas paired together 8 times in this example is possible, but is rather unlikely. The random sets of 8 ideas are sent to all the initial 1000 participants through the website.

The company or sponsor specifies the hurdle rate for an idea to pass beyond the second round of competition. For this example, the second hurdle rate may be the top 5 ideas. The participants vote through the website, the server tallies the votes, and the top 5 ideas are selected, either to be delivered to the company or sponsor, or to be entered into a third round of competition.

In this example, through two relatively simple voting steps in which each participant selects his/her favorite from a list of 10 and 8 ideas, respectively, the company and/or sponsor of the competition learns the best ideas of the crowd of participants. Any or all of the competition may be tailored as needed, including the number of voting rounds, the number of ideas per set, the hurdle rates, and so forth.

The following is a more detailed explanation of some of the internal tasks performed by the server, as in elements 14-17 of FIG. 1.

For this explanation, we will use numbers as proxies for ideas. We assume 1000 users, each generating an idea, for a total of 1000 ideas. For this example, we denote each idea by an objective ranking, with 1000 being the best idea and 1 being the worst. In practice, actual ideas may not have an objective ranking, but for this example, it is instructive to assume that they do, and to watch the progress of these ideas as they progress through the rating system.

First, we determine how many different "ideas" (numbers in our case) we want each participant to view/judge. In this example, we choose a value of 10.

Next we build a template for 1000 users with 10 views each and no two ideas ever matched more than once. An example of such a template is shown in FIG. 2; instructions on how to generate such a template are provided below. Note that this is just a template, and does not represent any views seen by the users.

Then, we randomly assign each of the 1000 participants to a number on the template. These assignments are shown in FIG. 3; in this case #771 is assigned to the 1 spot, #953 to the 2 spot, and so forth.

Each participant receives his/her 10 ideas and then votes for his/her favorite idea out of the 10. This "first choice" is denoted in the rightmost column in FIG. 3 as "local winner", and is shown for each participant.

For user #1, "idea" 953 is the best idea out of the 10 presented to user #1, and therefore user #1 rates it highest. For user #2, idea 983 is the best idea out of the 10 presented to user #2, and even beat out idea 953, which is user #1's first choice. This shows a benefit of random sorting with no repeat competitions. Specifically, idea 953 may be pretty good, beating out 95.3% of the other "ideas", but if all were riding on user #2's set, 953 would have been eliminated. For user #7, idea 834 passed through, due to a random juxtaposition with easy competition.

For this initial voting round, we use a sorting method that never pairs two "ideas" together more than once. This way, each of the 1000 ideas competes with 90 other ideas even though any one user never has to compare more than 10 ideas with each other. This helps keep the fidelity of the winners high, while at the same time helps reduce the work of individual users.

To demonstrate how effectively these "ideas" pass through the ranking system, we sort them by ranking and examine their winning percentage. This is shown in tabular form in FIG. 4. We then set a so-called "hurdle rate", such as 40%, and pass only "ideas" that win at least 40% of their 10 competitions.

For the best "ideas" (those with high numbers in this example), we expect to see high percentages of victory for the competitions in which they occur. For the particular hurdle rate of 40%, the top 86 competitors, numbered from 1000 down to 915, all passed with at least 40% of the first-choice votes of the competitions. For ideas numbering 914 and down, we randomly lose some ideas that were better than a few of the worst winners.

Considering that the goal of this parsing is to filter the best 1% or less of the 1000 ideas, there may be a considerable margin of safety. In this example, the users filter 11.8% of the total ideas and the return the absolute best 8.6%, which may be significantly larger than the 1% or less that is desired.

FIG. 5 is a tabular summary of the results of FIG. 4, for the initial round of voting. The best idea that is excluded by the initial round of voting is idea 914, denoted as "Best Miss". The worst idea that is passed on to further rounds of voting is idea 813, denoted as "Worst Survivor". Note that FIG. 5 provides an after-the-fact glimpse of the accuracy statistics of the initial round of voting; in a real voting session these would not be known unless the entire group of participants sorted through and ranked all 1000 ideas.

For the second round of voting, we include only the ideas that exceeded the hurdle rate of the initial round of voting. For simplicity, we assume that there were 100 of these ideas that exceed the hurdle rate of the initial round of voting. Note that we have 1000 participants but only 100 ideas to vote on, which implies that the fidelity of the second-round voting results may be even better than in the first-round, as a greater percentage of the participants vote on the remaining ideas.

For this second round of voting, we parse the 100 ideas into competitive sets of 8 ideas, rather than the 10-idea sets used in the initial round of voting, and distribute them to the initial 1000 participants. The rationale for this parsing choice is provided below.

Each of the 100 ideas appears in 80 unique competitive viewings for the second round, compared to 10 unique competitive viewings for the first round. This is an increased number of competitions per idea, even though any individual participant sees only 8 of the 100 ideas.

For the second round and any subsequent rounds, we may no longer enforce the "no two ideas ever compete with each other twice" rule. However, the most they can overlap is 8 out of the 80 competitions in the second round. Typically we expect no more than 2 or 3 pairings of any two particular ideas in the second round, with higher pairings become increasingly unlikely. For one or more voting rounds near the end of the session, in which the voting pool has been thinned to only a handful of ideas, the entire group of participants may vote directly on the entire voting pool of ideas.

FIG. 6 is a tabular summary of the second-round voting results. For a hurdle rate of 36%, the 11 best ideas are retained for subsequent voting or for delivery to the survey sponsor. Subsequent voting rounds would return the highest-ranked ideas. As the last round of voting, for a sufficiently low number of ideas, such as 3, 5 or 10, it may be desirable to have all participants vote on all the ideas, without regard for any duplicate pairings.

The preceding explanation, as well as the numerical results of FIGS. 2-6, is merely exemplary and should not be construed as limiting in any way. Two particular aspects of the above explanation are presented in greater detail below, including an exemplary set of instructions for generating a template, and an exemplary guide for selecting how many ideas are presented to each participant in a given round of voting.

As an alternative to having the participants choose only their favorite idea, i.e. a first choice, the participants may alternatively choose their first and second choices, or rank their top three choices. These may be known as "complex hurdles", and a "complex hurdle rate" may optionally involve more than a single percentage of competitions in which a particular idea is a #1 choice. For instance, the criteria for keep/dismiss may be 50% for first choice (meaning that any idea that is a first choice in at least 50% of its competitions is kept for the next round), 40%/20% for first/second choices (meaning that if an idea is a first choice in at least 40% of its competitions and is a second choice in at least 20% of its competitions is kept for the next round), 30%/30% for first/second choices, 20%/80% for first second choices, and/or 10%/80% for first/second choices. The complex hurdle rate may include any or all of these conditions, and may have variable second choice requirements that depend on the first choice hurdle rate.

The following three paragraphs provide a rationale for choosing the number of ideas to include in a group for each participant, based on the number of participants and the constraint that no two particular ideas should appear together in more than one group. Based on this rationale, each idea may be compared with a maximum number of other ideas for a given round of voting.

The rationale includes a known sequence of integers, known in number theory as the Mian-Chowla sequence. The following description of the Mian-Chowla sequence is taken from the online reference wikipedia.org:

In mathematics, the Mian-Chowla sequence is an integer sequence defined recursively in the following way. Let $a_1=1$. Then for $n>1$, $a_n$ is the smallest integer such that the pairwise sum $a_i+a_j$ is distinct, for all i and j less then or equal to n. Initially, with $a_1$ there is only one pairwise sum, $1+1=2$. The next term in the sequence, $a_2$, is 2 since the pairwise sums then are 2, 3 and 4, i.e., they are distinct. Then, $a_3$ can't be 3 because there would be the non-distinct pairwise sums $1+3=2+2=4$. We find then that $a_3=4$, with the pairwise sums being 2, 3, 4, 5, 6 and 8. The sequence continues 8, 13, 21, 31, 45, 66, 81, 97, 123, 148, 182, 204, 252, 290, 361, 401, 475, and so forth. This sequence is used because the difference between any two numbers in the sequence is not repeated, which becomes useful in the construction of templates, described in detail below.

For a given number of participants and a given number of ideas, we denoted the quantity p as the lesser of the number of participants and the number of ideas. We choose the number of ideas n in a group to be the largest integer n that satisfies $(2a_n-1) \geq p$. For instance, for 100 participants and 100 ideas total to be voted upon, p is 100, $(2a_8-1)$ is 89, which satisfies the above equation, and $(2a_9-1)$ is 131, which does not satisfy the above equation. Therefore, for 100 ideas distributed among 100 participants, we choose 8 ideas per group. Several numerical examples are provided by FIG. 7.

The preceding rationale provides one exemplary choice for the number of ideas to be included in each group that is distributed to the voting participants. It will be understood by one of ordinary skill in the art that other suitable numbers of ideas per group may also be used.

The following is an exemplary set of instructions for generating a template. It will be understood by one of ordinary skill in the art that any suitable template may be used.

Due to the large and unwieldy number of combinations that are possible, it may be beneficial to have the server dynamically generate a suitable template for a particular number of ideas per group and a particular number of participants. In some embodiments, this dynamic generation may be preferable to generating beforehand and storing the suitable templates, simply due to the large number of templates that may be required.

The following is a formulaic method that can randomly scatter the ideas and parse them into groups or sets of various sizes, while never pairing any two ideas more than once. The method may be run fairly quickly in software, and may be scalable to any number of users or ideas per set.

First, we determine the number of ideas to include in each group of ideas that is voted upon. This may be done using the rationale described above, although any integer value up to and including the value prescribed by the rationale will also provide the condition that no two ideas are paired together more than once.

Typically, the first round of voting uses the rationale described above, with the constraint that no two ideas compete against each other more than once. For subsequent rounds of voting, this constraint is relaxed, although a template generated as described herein also reduces the number of times two ideas compete against each other.

For illustrative purposes, we assume that we have 100 participants and 100 ideas total for voting, and that we use 8 ideas per group for the initial round of voting. Each of the 100 ideas has a corresponding number, 1 through 100, which has no particular significance of its own, but is used in the template as a placeholder for identifying a particular idea.

For the first participant, we assign 8 ideas corresponding to the first 8 numbers in the Mian-Chowla sequence: 1, 2, 4, 8, 13, 21, 31 and 45.

For each subsequent participant, we increment by one the idea numbers of the previous participant. For instance, for the second participant, we increment by one the idea numbers of the first participant: 2, 3, 5, 9, 14, 22, 32 and 46. For the third participant, we increment by one the idea numbers of the second participant: 3, 4, 6, 10, 15, 23, 33 and 47.

Once idea #100 is reached, we start back at #1. For instance, for participant #56, the idea numbers are: 56, 57, 59, 63, 68, 76, 86 and 100. For participant #57, the idea numbers are: 57, 58, 60, 64, 69, 77, 87 and 1. As another example, for participant #97, the idea numbers are: 97, 98, 100, 4, 9, 17, 27 and 41. For participant #98, the idea numbers are: 98, 99, 1, 5, 10, 18, 28 and 42. For participant #99, the idea numbers are: 99, 100, 2, 6, 11, 19, 29 and 43. For participant #100, the idea numbers are: 100, 1, 3, 7, 12, 20, 30 and 44.

Mathematically, starting back at #1 is equivalent to an operation in modular arithmetic. For instance, 101 equals 1+101 mod 100, or 1 plus 101 modulo the number of ideas in the plurality. For the purposes of this application, the "1" may be neglected, and the modulus definition may include sequences such as 98, 99, 100, 1, 2, rather than the strict mathematical modulo sequence of 98, 99, 0, 1, 2. Since the idea numbers are merely placeholders to be later paired up with ideas, we ignore any representational differences between 0 and 100, and choose to use 100 because we normally begin a count with the number 1 rather than 0.

FIG. 8 is a tabular representation of the distribution of idea numbers among the participants, as described above.

If there are more participants than ideas, we continue assigning idea numbers in the recursive manner described above.

Note that there are two particularly desirable features of this distribution of idea numbers among the participants. First, each particular pair of idea numbers appears together in at most one participant's group of ideas. Second, each particular idea shows up in exactly 8 participants' groups of ideas. If the number of participants exceeds the number of ideas, some ideas may receive more entries in the template than other ideas. Any inequities in the number of template entries may be compensated if the "winners" in each voting round are chosen by the percentage of "wins", rather than the absolute number of "wins".

Next, we randomly assign the participant numbers to the true participants, and randomly assign the idea numbers to the true ideas. This randomization ensures that that a particular participant receives a different set of ideas each time the process is run.

Finally, we scan each of the entries in the template to find entries in which a particular participant receives his/her own idea in his/her group. Because we don't want to have a participant rate his/her own idea, we swap idea sets with other participants until there are no more cases where a particular participant has his/her own idea in his/her group.

The above formulaic method for randomly scattering the ideas and parsing them into groups of various sizes may be extended to any number of participants, any number of ideas, and any number of ideas per group. For an equal number of participants and ideas, if the number of ideas per group is chosen by the rationale described above, any two ideas are not paired more than once.

There may be instances when there are more participants than ideas. For instance, if the initial round of voting has equal numbers of ideas and participants, then subsequent rounds of voting may likely have more participants than ideas, because some ideas have been eliminated. For more participants than ideas, the templates may be constructed for the particular number of ideas, and may be repeated as necessary to cover all participants. For later rounds of voting, in which the number of ideas may be manageable, such as 2, 3, 4, 5, 8, 10 or any other suitable integer, the templates may not even be used, and the entire small group of ideas may be distributed to all participants for voting. In this manner, the entire group of participants may directly vote for the winning idea to form the consensus.

There may be instances when there are more ideas than participants. For instance, a panel of 10 participants may vote on 30 ideas. If there are significantly more ideas than participants, such as by a factor of 2, 3 or more, then it may be beneficial to first form multiple, separate templates, then join them together to form a single template.

Using the example of 10 participants and 30 ideas, we find the largest number of ideas per group for 10 participants, based on the rationale above and the tabular data in FIG. 7. This value turns out to be three ideas per group. It may be more efficient to increase the number of ideas per group because each participant may readily handle more than 3 choices, so we choose to make three templates—one for idea numbers 1-10, one for idea numbers 11-20 and one for idea numbers 21-30—and stitch them together afterwards. FIG. 9 is a tabular representation of a stitched-together template. For the exemplary stitched-together template of FIG. 9, there are 9 ideas per group, with each of the 30 total ideas appearing in 3 groups.

Because there may be so few groups containing a particular idea, it may be beneficial to have each participant pick his/her first and second ranked choices, or top three ranked choices.

The following is an example of an algorithm to guard against fraud. Such an algorithm may be useful to foil any potential scammers or saboteurs who may deliberately vote against good ideas in the hopes of advancing their own ideas.

A simple way to guard against fraud is to compare each participant's choices to those of the rest of the participants after a round of voting is completed. In general, if a participant passes up an idea that is favored by the rest of the participants, or advances an idea that is advanced by few or no other participants, then the participant may be penalized. Such a penalty may be exclusion from further voting, or the like. Once a fraud is identified, his/her choices may be downplayed or omitted from the vote tallies.

Mathematically, an exemplary way to find a fraud is as follows. For each idea, define a pass ratio as the ratio of the number of wins for the idea, divided by the total number of competitions that the idea is in. Next, calculate the pass ratios for each idea in the group. Next, find the differences between the pass ratio of each idea in the group and the pass ratio of the idea that the participant chooses. If the maximum value of these differences exceeds a particular fraud value, such as 40%, then the participant may be labeled as a fraud. Other suitable ways of finding a fraud may be used as well. Once a fraud is identified, the fraud's voting choices may be suitably discounted. For instance, of the group of ideas presented to the fraud, the fraud's own voting choice may be neglected and given instead to the highest-ranking idea present in the fraud's group of ideas. In addition, the fraud's choices may be used to identify other frauds among the participants. For instance, if a probable fraud picked a particular idea, then any other participant that picked that particular idea may also by labeled as a fraud, analogous to so-called "guilt by association". This may be used sparingly to avoid a rash of false positives.

Due to the random nature of the idea parsing, in which ideas are randomly grouped with other ideas, there may be instances when an idea is passed on to future voting rounds because it has unusually weak competition, or is blocked from future voting rounds because it has unusually strong competition. This random nature is most problematic for ideas that would otherwise rate at or near the hurdle rates, where just a small change in voting up or down could decide whether the idea is passed along or not. The following is a description of four exemplary algorithms for compensating for such a random nature of the competition.

A first algorithm for compensating for the random nature of the competition is described as follows.

We define a quantity known as "tough competition percentage" as the fraction of an idea's competition groups that contain at least one competitor that scored a higher percentage of wins that the idea in question. The "tough competition percentage" is calculated after a particular round of voting, and may be calculated for each idea.

If a particular idea is paired up with unusually strong competition in the various idea groups that contain it, then after the round of voting, its "tough competition percentage" may be relatively high. Likewise, unusually weak competition may produce a relatively low "tough competition percentage".

Given a "win percentage" defined as the ratio of the number of groups in which a particular idea wins the voting, divided by the number of groups in which a particular idea appears, and given the "tough competition percentage"

defined above, we may perform the following calculations, shown schematically in FIG. 10

Rank the ideas by "win percentage", as in the second column. Calculate the "tough competition percentage", as in the fourth column. From the "tough competition percentage" in the fourth column, subtract the "tough competition percentage" of the idea below the idea in question, listed in the fifth column, with the difference being in the sixth column. Add the difference in the sixth column to the "win percentage" in the second column to arrive at a so-called "new score" in the seventh column. If any values in the seventh column are ranked out of order, then switch them.

In addition to this first algorithm described above and shown schematically in FIG. 10, there may be other algorithms that help compensate for unusually strong or unusually weak competition. A second algorithm for compensating for the random nature of the competition is described as follows.

We define a so-called "face-off ratio" as the number of times a particular idea beats another particular idea, divided by the number of groups that contain both of those two ideas. If a "face-off ratio" of an idea with the idea that is ranked directly adjacent to it exceeds a so-called "face-off ratio threshold", such as 66% or 75%, then the two ideas may be switched. This "face-off ratio" may not be used in the first round of voting, because two ideas may not be paired together more than once.

A third algorithm for compensating for the random nature of the competition is described as follows.

After a particular round of voting, each idea has a "win percentage", defined as the ratio of the number of groups in which a particular idea wins the voting, divided by the number of groups in which a particular idea appears.

For each group in which a particular idea appears, we find the maximum "win percentage" of all the ideas in the group, excluding the "win percentage" of the idea in question. We denote this as a "top see win percentage" for the group, for the idea in question. If the idea in question won/lost the voting for the group, then we denote this as beating/losing to a group with a particular "top see win percentage". We repeat this for each of the groups in which a particular idea appears. We then find the highest "top see win percentage" that the idea beat and increment it by (1/the number of ideas per group), find the lowest "top see win percentage" that the idea lost to and decrement it by (1/the number of ideas per group), and average those two numbers with the "win percentage" of the idea in question to form a "new score" for each idea. If the "new score" of a particular idea differs from its "old score" by more than a particular threshold, such as 6%, then we change its "old score" to the "new score" and repeat the previous steps in the algorithm at least once more.

A fourth algorithm for compensating for the random nature of the competition is described as follows.

After a particular round of voting, each idea has a "win percentage", defined as the ratio of the number of groups in which a particular idea wins the voting, divided by the number of groups in which a particular idea appears.

Tally the "win percentages" of all the other individual ideas that appear in all the groups in which the particular idea appears. Find the highest win percentage from every competitive set that includes the particular idea and denote as "top sees". From these tallied "top sees", find Q1 (the first quartile, which is defined as the value that exceeds 25% of the tallied "top sees"), Q2 (the second quartile, which is defined as the value that exceeds 50% of the tallied "top sees", which is also the median "top see" value), and Q3 (the third quartile, which is defined as the value that exceeds 75% of the tallied "top sees").

Note that if the competition is truly random, and if the groups are truly randomly assembled, then a fair median "top see" for all the other individual ideas that appear in all the groups in which the particular idea appears would be 50%. If the calculated Q2 differs from this fair value of 50% by more than a threshold, such as 10%, then we deem the competition to be unfair and proceed with the rest of this fourth correction algorithm.

Similarly, if the difference between (Q3−Q2) and (Q2−Q1) exceeds a threshold, such as 10%, then we see that the distribution may be skewed, and also deem the competition to be unfair and proceed with the rest of this fourth correction algorithm.

We define a "new score" as the idea's original "win percentage", plus (Q1+Q3−50%). The ideas may then be re-ranked, compared to adjacent ideas, based on their "new scores". The re-ranking may occur for all ideas, or for a subset of ideas in which at least one of the two triggering conditions above is satisfied.

Alternatively, other percentile values may be used in place of Q1, Q2 and Q3, such as P90 and P10 (the value that exceeds 90% and 10% of the tallied "win percentages", respectively.) In addition to the four algorithms described above, any suitable algorithm may be used for adjusting for intra-group competition that is too strong or too weak.

In some embodiments, it may be useful to periodically or occasionally check with the participants and ensure that they agree with the status of the session for their voting. For instance, an agenda may be written up by a group of participants, posted, and voted on by the all the participants. The full agenda or individual items may be voted on the group, in order to provide immediate feedback. Such approval voting may be accomplished in discrete steps or along a continuum, such as with a toggle switch or any suitable mechanism. This approval voting may redirect the agenda according to the overall wishes of the participants.

In some embodiments, two or more ideas may be similar enough that they end up splitting votes and/or diluting support for themselves. These ideas may be designated as so-called "equals", and their respective and collective votes may be redistributed or accumulated in any number of ways. For instance, some participants may be asked to identify any equals from their sets. Other participants who voted on these ideas may be asked to confirm two or more ideas as being "equal", and/or may choose a preferred idea from the group of alleged "equals". The votes tallied from these "equals" may then be combined, and the preferred idea may move on the next round of voting, rather than all the ideas in the group of "equals".

In some embodiments, a credit or debit card may be used to verify the identity of each participant, and/or to credit a participant suitably if the participant's idea advances to an appropriate voting stage.

In some embodiments, there may be some participants that are desirably grouped together for voting. These participants may be grouped together by categories such as job title, geographic location, or any other suitable non-random variable.

In some embodiments, it may be desirable to deal with polarizing ideas and/or polarized participants. For instance, a combined group of Democrats and Republicans may be voting on a particular group of ideas, where some ideas appeal to Democrats but not Republicans, and vice versa. For the polarized situations, the participants may optionally separate themselves into smaller subgroups, by casting a so-called "anti-vote" for a particular idea or ideas.

In some embodiments, a participant may attach an afterthought, a sub-idea and/or a comment to a particular idea, which may be considered by the group of participants in later rounds of voting. Such a commented idea may accumulate "baggage", which may be positive, negative, or both.

In some embodiments, it may be desirable to test the voting and selection systems described above, as well as other voting and selection systems. Such a test may be performed by simulating the various parsing and voting steps on a computer or other suitable device. The simulation may use numbers to represent "ideas", with the numerical order representing an "intrinsic" order to the ideas. A goal of the simulation is to follow the parsing and voting techniques with a group of numbers, or intrinsically-ordered ideas, to see if the parsing and voting techniques return the full group of ideas to their intrinsic order. If the full order is not returned, the simulation may document, tally and/or tabulate any differences from the intrinsic order. It is understood that the testing simulation may be performed on any suitable voting technique, and may be used to compare two different voting techniques, as well as fine-tune a particular voting technique.

As an example, we trace through the voting technique described above. We start with a collection of participants and ideas, in this case, 10,000 of each. We calculate the number of ideas per group for 10,000 participants, then form a template based on the number of ideas per group, and the total number of ideas and participants. We may use the template described above, based on the Mian Chowla sequence of integers, or may use any other suitable template. We then parse the ideas into subgroups based on the template, and randomize the ideas so that the numbers no longer fall sequentially in the template. We then perform a simulated vote for each participant, with each participant "voting" for the largest (or smallest) number in his/her group of ideas. We may optionally include deliberate errors in voting, to simulate human factors such as personal preference or fraud. We then tally the votes, as described above, keep the "ideas" that exceed a particular voting threshold, re-parse the "ideas", and repeat the voting rounds as often as desired. At the end of the voting rounds, the largest (or smallest) number should have won the simulated voting, and any discrepancies may be analyzed for further study.

In some embodiments, it may be desirable to edit a particular idea, suggest an edit for a particular idea, and/or suggest that the author of an idea make an edit to the particular idea. These edits and/or suggested edits may change the tone and/or content of the idea, preferably making the idea more agreeable to the participants. For instance, a suggested edit may inform the idea's originator that the idea is unclear, requires elaboration, is too strong, is too wishy-washy, is too vulgar, requires toning down or toning up, is too boring, is particularly agreeable or particularly disagreeable, is incorrect, and/or is possibly incorrect. In some embodiments, these edits or suggested edits may be performed by any participant. In some embodiments, the edits are shown to the idea's originator only if the number of participants that suggested the same edit exceeds a particular threshold. In some embodiments, edits to an idea may only be performed by the originator of the idea. In some embodiments, edits may be performed by highlighting all or a portion of an idea and associating the highlighted portion with an icon. In some embodiments, the group of participants may vote directly on an edit, and may approve and/or disapprove of the edit. In some embodiments, severity of suggested edits may be indicated by color. In some embodiments, multiple edits to the same idea may be individually accessible. In some embodiments, the ideas may be in video form, edits may be suggested on a time scale, and edit suggestions may be represented by an icon superimposed on or included with the video.

There are some instructive quantities that may be defined, which may provide some useful information about the voting infrastructure, regardless of the actual questions posed to the participants.

The "win percentage", mentioned earlier, or "win rate", is defined as the ratio of the number of groups in which a particular idea wins the voting, divided by the number of groups in which a particular idea appears.

The "hurdle rate" is a specified quantity, so that if the "win percentage" of a particular idea exceeds the hurdle rate, then the particular idea may be passed along to the next round of voting. The "hurdle rate" may optionally be different for each round of voting. The "hurdle rate" may be an absolute percentage, or may float so that a desired percentage of the total number of ideas is passed to the next voting round. The "hurdle rate" may also use statistical quantities, such as a median and/or mean and standard deviation; for instance, if the overall voting produces a mean number of votes per idea and a standard deviation of votes per idea, then an idea may advance to the next round of voting if its own number of votes exceeds the mean by a multiple of the standard deviation, such as 0.5, 1, 1.5, 2, 3 and so forth. The "hurdle rate" may also apply to scaled or modified "win percentages", such as the "new scores" and other analogous quantities mentioned earlier.

Note that for this application, the term "exceeds" may mean either "be greater than" or "be greater than or equal to".

A "template" may be a useful tool for dividing the total collection of ideas into groups. The template ensures that the ideas are parsed in an efficient manner with constraints on the number of times a particular idea appears and how it may be paired with other ideas. Once the template is in place, the slots in the template may be randomized, so that a particular idea may appear in any of the available slots in the template.

A "perfect inclusion" may be the defined as the ratio of the number of ideas that scored higher than the highest-scoring idea that fails to exceed the hurdle rate, divided by the total number of ideas.

A "perfection ratio" may be defined as the ratio of the "perfect inclusion", divided by the "win percentage".

A "purity ratio" may be defined as the ratio of the number of ideas with a "win percentage" that exceeds the "hurdle rate", divided by the number of ideas with a "win percentage" that should exceed the "hurdle rate".

The "purity ratio" may be different for different values of "win percentage", and may therefore be segmented into various "sector purity ratio" quantities.

An "order" test may be performed, in which the actual ranking of an idea is subtracted from the expected ranking of the idea.

In addition to the methods and devices described above, there are two additional quantities that may be used to enhance or augment the ratings that are given to the ideas. A first quantity is the amount of time that a person spends performing a particular rating. A second quantity is a so-called "approval" rating, which pertains more to the style or type of question being asked, rather than to the specific answer chosen by the group. Both of these quantities are explained in greater detail below.

There is much to be learned from the amount of time that a person spends deliberating over a particular rating. For instance, if a person gives a positive rating to a particular idea, and does it quickly, it may indicate that the person has strong support for the idea. Such a quick, positive reaction may show that there is little or no opposition in the mind of the participant. In contrast, if the person gives the same positive rating to the idea, but takes a long time in doing so, it may indicate that the person does not support the idea as strongly. For instance, there may be some internal debate in the mind of the participant.

This rating evaluation time may be used as a differentiator between two otherwise equivalent ratings. For many of these cases, the evaluation time is not weighted heavily enough to bump a rating up or down by one or more levels. However, there may be alternative cases in which the evaluation time is indeed used to bump up or down a particular rating.

For positive ratings, a quick response may be considered "more" positive than an equivalent slow response. In terms of evaluation times, a positive response with a relatively short evaluation time may be considered "more" positive than the equivalent response with a relatively long evaluation time. In other words, for two responses that receive the same positive rating, a quick response may rate higher (more positive) than a slow response.

Likewise, for a neutral response, a quick response may also be considered more positive than a slow response. In other words, for two equivalent neutral responses, the response with the shorter evaluation time may be considered more positive than the response with the longer evaluation time.

The logic behind the positive and neutral ratings is that deliberation in the mind of the evaluator shows some sort of internal conflict. This conflict may be interpreted as a lack of wholehearted, or unquestioning support for the idea under evaluation.

For negative responses, in which the participant disapproves of a particular idea by giving it a negative rating, the same type of internal conflict argument may be made. For negative responses, a quick rating may show that the participant is highly critical of the idea, since there is little internal debate. A slower negative response may show internal conflict for the participant. These are consistent arguments with the positive and neutral cases, but they lead to inverted weighting for the negative ratings.

Specifically, because a quick negative rating shows little opposition in the mind of the participant, a quick negative rating is "more negative" than a slow negative rating. In other words, for two equivalent negative ratings, the rating having the longer evaluation time is more positive than that having the shorter evaluation time.

These cases are summarized in the exemplary table of FIG. 11. There are three possible ratings that can be given to a particular idea—positive, neutral or negative. In other examples, there may be additional rating levels, such as highly positive or highly negative. In still other examples, there may a numerical scale used, such as a scale from 1 to 10, 1 to 5, or any other suitable scale. The numerical scale may include only discrete values (1, 2, 3, 4 or 5, only) or may include the continuum of values between levels.

For each rating level, the evaluation time of the participant is noted. As with the rating levels themselves, the evaluation time may be lumped into discrete levels (short, medium, long), or may recorded and used as a real time value, in seconds or any other suitable unit. For the example of FIG. 11, the evaluation time is taken as a discrete value of short, medium or long.

The initial participant rating of positive/neutral/negative is weighted by the participant evaluation time of short/medium/long to produce the weighted ratings of FIG. 11. In this example, the weighted ratings have numerical values, although any suitable scale may be used. For instance, an alphabetical scale may be used (A+, A, A−, B+, B, B−, C+, C, C−, D+, D, D−, F), or a text-based scale may be used (very positive, somewhat positive, less positive), and so forth.

The weighted ratings may be used to differentiate between two ideas that get the same participant rating. The weighted ratings may also be used for general tabulation or tallying of the idea ratings, such as for the methods and devices described above.

If the evaluation time is to be grouped into discrete levels, such as "short", "medium" and "long", it is helpful to first establish a baseline evaluation time for the particular participant and/or idea. Deviations from the baseline are indicative of unusual amounts of internal deliberation for a particular idea.

The baseline can account for the rate at which each participant reads, the length (word count and/or complexity) of each idea, and historical values of evaluation times for a given participant.

For instance, to establish a reading rate, the software may record how long it takes a participant to read a particular page of instructions. The recording may measure the time from the initial display of the instruction page to when the participant clicks a "continue" button on the screen. The reading rate for a particular participant may optionally be calibrated against those of other participants.

To establish a baseline for each idea, the software may use the number of words in the idea, and optionally may account for an unusually large or complex words. The software may also optionally use the previous evaluations of a particular idea to form the baseline.

In some cases, the software may use any or all factors to determine the baseline, including the reading rate, the idea size, and historical values for the evaluation times.

Once the baseline is determined, a raw value of a particular evaluation time maybe normalized against the baseline. For instance, if the normalized response time matches or roughly matches the baseline, it may be considered "medium". If the normalized response time is unusually long or short, compared to the baseline, it may be considered "long" or "short".

If a particular response is well outside the expected values for response time, that particular weighted rating may optionally be thrown out. Likewise, if the reading rate is well outside an expected value, the weighted ratings for the participant may also be thrown out. In many cases, the values of the "thrown out" data points are filled in as if they were "medium" response times.

The discussion thus far has concentrated on using the time spent for evaluations as weighting factors for the ratings. In addition to evaluation time, another useful quantity that may be gathered during evaluations is a so-called "approval level".

In some cases, the approval level may be used to judge the particular questions or topics posed to the participants, rather than the answers to those questions.

For instance, we assume that there is an agenda for the questions. Once an answer for a particular question is determined by consensus from the participants, the agenda dictates which question is asked next. The agenda may also include topics for discussion, rather than just a list of specific questions.

As evaluations progress, the participants can enter an "approval level", which can be a discrete or continuous value, such as a number between 0% and 100%, a letter grade, such as A− or B+, or a non-numerical value, such as "strongly disapprove" or "neutral".

The approval level may be used to approve/disapprove of the question itself, or of a general direction that the questions are taking. For instance, if a particular train of questions is deemed too political by a participant, the participant may show his dissatisfaction by submitting successively lower approval ratings for each subsequent political question.

The collective approval ratings of the participants may be tallied and displayed in essentially real time to the participants and/or the people that are asking the questions. If the approval rate drops below a particular threshold, or trends downward in a particular manner, the question-askers may choose to deviate from the agenda and change the nature of the questions being asked.

For example, consider a first question posed to the group of participants. The participants may submit ideas of their own and rate them, or may vote on predetermined ideas, resulting in a collectively chosen idea that answers the question. The participants submit approval levels for the first question. The question-asking person or people, having received an answer to the first question, ask a second question based on a particular agenda. The participants arrive at a consensus idea that answers the second question, and submit approval levels for the second question. If the approval rate is too low, the question-askers may choose to deviate from the agenda to ask a third question. This third question is determined in part by the approval levels for the first and second questions. The asking, rating, and approving may continue indefinitely in this manner. The approval levels, taken as single data points or used as a trend, provide feedback to the question-askers as to whether they are asking the right questions.

Figure 12:
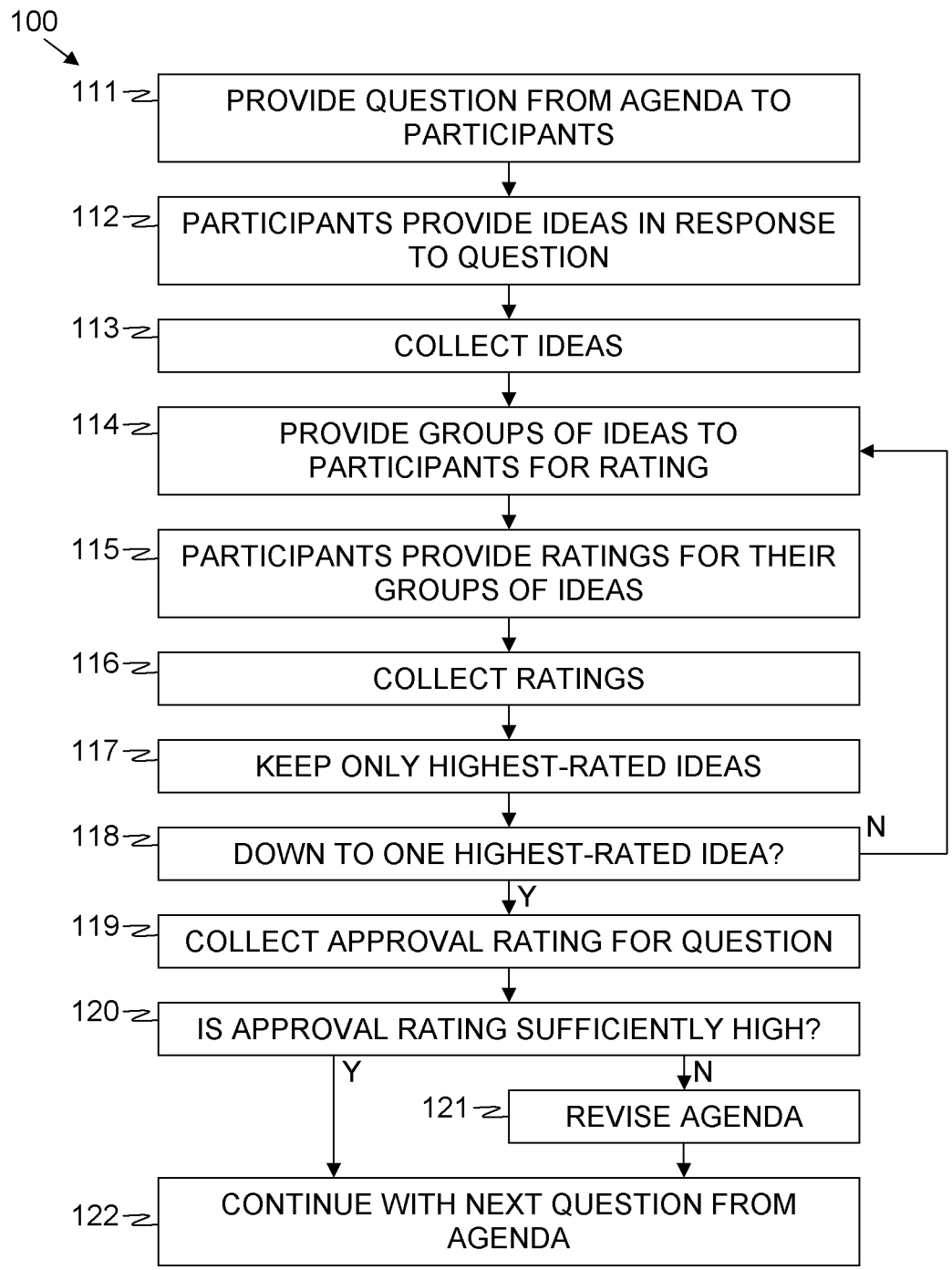
FIG. 12 is a flowchart of a consensus selection process featuring approval ratings.

FIG. 12 shows an exemplary flowchart 100 for the approval ratings. In element 111, a question is selected from a predetermined agenda and provided to the participants. Elements 112-118 are directly analogous to elements 12-18 from FIG. 1. In element 119, the software collects approval ratings corresponding to the question from the participants. If the approval rate is sufficiently high, as determined by element 120, the questions proceed according to the agenda, as in element 122. If the approval rate is not sufficiently high, then the agenda is revised, as in element 121, and a question is asked from the revised agenda.

The description of the invention and its applications as set forth herein is illustrative and is not intended to limit the scope of the invention. Variations and modifications of the embodiments disclosed herein are possible, and practical alternatives to and equivalents of the various elements of the embodiments would be understood to those of ordinary skill in the art upon study of this patent document. These and other variations and modifications of the embodiments disclosed herein may be made without departing from the scope and spirit of the invention.

We claim:

1. A method for rating a plurality of ideas, wherein a computer program for executing the method is stored in a non-transitory computer readable medium which, when loaded on a computer, makes the computer perform the method, said method comprising the steps of:

a. electronically distributing a first universe of ideas, divided into idea sets, to a group of participants, in parallel, wherein each participant receives at least one idea set, and wherein the universe of ideas are divided so that the number of idea sets generally equals the number of participants and wherein each idea has a substantially equal and fair probability of being viewed and voted on by an a generally equal number of participants;

b. having each participant select from their idea set, via an input device, at least one highest ranking idea;

c. establishing a threshold hurdle win rate which comprises a predetermined number against which said participant ranking for each idea are compared; segregating the ideas which exceed said predetermined number as winning ideas and creating a first subgroup of ideas which exceed said predetermined number;

d. electronically re-distributing the first sub group of ideas to said participants, divided into second idea sets to all participants in parallel wherein each participant receives at least one second idea set; wherein the plurality of ideas are divided so that the number of second idea sets generally equals the number of participants and wherein each idea has a substantially equal and fair probability of being viewed and voted on by an a generally equal number of participants; whereby the number of ideas is reduced while the number of participants is generally not reduced, thereby more participants are applied to the remaining ideas;

e. having each participant select from their second idea set, via the input device, at least one highest ranking idea;

f. establishing a second threshold hurdle win rate which comprises a second predetermined number against which the participant rankings for each idea are compared; segregating the ideas which exceed said second predetermined number as wining ideas and creating a second subgroup of ideas which exceed said second predetermined number for ranking in subsequent rounds;

g. electronically re-distributing the second subgroup of ideas to said participants, divided into third idea sets to all participants, in parallel, wherein each participant receives at least one third idea set; wherein the third subgroup of ideas are divided so that the number of third idea sets equals the number of participants and wherein each idea has a substantially equal and fair probability of being viewed and voted on by a generally equal number of participants;

h. having each participant select from their third idea set, via the input device, at least a one highest ranking idea;

i. establishing a third threshold hurdle win rate which comprises a third predetermined number against which the participant rankings for each idea are compared; segregating the ideas which exceed said third predetermined number as winning ideas and creating a third subgroup of ideas which exceed said third predetermined number to produce an output of at least one winning idea, wherein each of steps (a), (d) and (g) comprises steps for generating a template for dividing plurality of ideas into groups, each groups of ideas to be distributed to each of plurality of participants by;

selecting a number of ideas per group in response to a number of participants;

denoting the number of ideas per group as m;

defining a plurality of first participants' idea numbers as the first m Main-Chowla numbers; and recursively defining a plurality of $(i+1)^{th}$ participant's idea numbers, where i is a positive integer, as the plurality of $i^{th}$ participant's idea numbers incremented by 1 and modulo the number of ideas in the plurality; and wherein said selecting comprises:

denoting the lesser of the number of participants and the number of ideas in the plurality as p;

providing a Mian-Chowla number $a_n$, the Mian-Chowla number bein the $n^{th}$ integer in the Mian-Chowla sequence;

forming a quantity $(2a_n-1)$;

solving for n to be the largest integer that satisfies $(2a_n-1) \geq p$; and setting the number of ideas per group to be n;

whereby the program is terminated or proceeds to subsequent rounds of redistributing ideas to further increase the accuracy of the method and whereby effectively a large number of ideas is distillable by a mass participant group.

2. The method of claim 1 further comprising additional steps of:
allowing participants to identify that they disagree with a winning idea by segregating a tally of such disagreeing participants.

3. The method of claim 1 further including steps for editing ideas, comprising:
from a participant's selection of at least one highest ranking idea allowing the participant to indicate an objection to a portion of said highest ranking idea; tallying objections of other participants to the same objection, if the tally exceeds a predetermined trigger threshold, requesting submission of revisions to an idea from the participants; redistributing revisions received from the participants and ranking them according to steps (a) to (e) as if the revision is an idea set.

4. The method of claim 3, wherein the revision is provided by an author of the initial idea.

5. The method of claim 4, wherein the author of the initial idea is a participant in the group.

6. The method of claim 3, wherein the revision is provided by the group of participants.

7. The method of claim 1 further comprising steps for eliminating duplicative ideas including the steps of:
i. querying participants for data input responsive to the question of whether the participant finds two ideas to be substantially similar;
ii. conjoining particular initial ideas that are deemed equivalent by the plurality of participants;
iii. selecting only one of said similar ideas for further grouping in successive rankings by participants.

8. The method of claim 1 further comprising:
attaching a supplemental idea to a particular initial idea; and
including a random sampling of proposed supplemental idea in each first subgroup of ideas that contains the particular initial idea and having the participants select the idea for inclusion in future voting rounds.

9. The method of claim 1 further comprising steps to create a subgroup of participants from a group where the participant indicates an objection to at least one highest ranking idea, including the steps of:
allowing said participant to extract itself from any group which supports said at least one highest ranking idea and creating at least one subgroup of participants with similar objections.

10. The method of claim 3, wherein the revisions introduced by the participant is indicated by color, and wherein the idea with color indication is presented to the participants for a vote.

11. The method of claim 3, wherein the revisions are edits introduced by participant, and wherein participants vote on acceptance of the edit.

12. The method of claim 7, wherein any participant is able to propose an edit to an idea, such edits to be considered by the other participants, whereby a proposed edit is marked by the participant on at least a portion of the idea, with a marking icon;
if the percentage of participants marking a given section of text exceeds a predetermined revision trigger threshold, that edit is then given to the participants who have at least once voted on the idea in question in accordance with steps (a) to (e) as if the revision is an idea set.

13. The method of claim 1 further including steps for voting fraud detection and anti-consensus detection, comprising the steps of:
comparing a particular participant's voting activity, to consensus choices, after a given round of voting by examining the win ratio of the participants choice versus the win ratio of ideas that were directly competing with the particular participant's chosen idea and determining if those ideas that were passed over had a sufficiently greater win ratio and thus were far more favored by the other participants to justify negating the participant's vote, and in such case removing the participant's vote from future rounds of voting.

14. The method of claim 1, further including steps for voting fraud detection, comprising the steps of:
defining a win ratio as the ratio of the number of wins for a particular idea, divided by the total number of competitions that the idea is in;
calculating the pass ratios for each idea in a given competitive set;
determining the differences between the pass ratio of each idea in the competitive set and the pass ratio of the idea that the participant chooses;
setting a maximum value allowed for the differences to exceed before labeling a vote a fraud and then discarding that vote and giving the win to the highest ranked idea in that set, as determined by other participants prior votes.

15. A computer based method for rating a plurality of ideas, wherein a computer program for executing the method is stored in a non-transitory computer readable medium which, when loaded on a computer, makes the computer perform the method, said method comprising the steps of:
a. electronically distributing a first universe of ideas, divided into idea sets, to a group of participants, in parallel, wherein each participant receives at least one idea set, and wherein the universe of ideas are divided so that the number of idea sets generally equals the number of participants and wherein each idea has a substantially equal and fair probability of being viewed and voted on by generally equal number of participants;
b. having each participant select from their idea set, via an input device, at least one highest ranking idea;
c. establishing a threshold hurdle win rate which comprises a predetermined number against which said participant ranking for each idea are compared; segregating the ideas which exceed said predetermined number as winning ideas and creating a first subgroup of ideas which exceed said predetermined number;
d. electronically re-distributing the first sub group of ideas to said participants, divided into second idea sets to all participants in parallel wherein each participant receives at least one second idea set; wherein the plurality of ideas are divided so that the number of second idea sets generally equals the number of participants and wherein each idea has a substantially equal and fair probability of being viewed and voted on by generally equal number of participants;
e. having each participant input, via the input device, a selection from their second idea set of at least a highest ranking idea;
f. establishing a second threshold hurdle win rate which comprises a second predetermined number against which the participant rankings for each idea are compared; segregating the ideas which exceed said second predetermined number as wining ideas and creating a second subgroup of ideas which exceed said second predetermined number to produce an output of at least one winning idea, wherein each of steps (a) and (d) comprises steps for generating a template for dividing plurality of ideas into groups, each groups of ideas to be distributed to each of plurality of participants by;

selecting a number of ideas per group in response to a number of participants;

denoting the number of ideas per group as m;

defining a plurality of first participants' idea numbers as the first m Main-Chowla numbers; and recursively defining a plurality of $(i+1)^{th}$ participant's idea numbers, where i is a positive integer, as the plurality of $i^{th}$ participant's idea numbers incremented by 1 modulo the number of ideas in the plurality; and wherein said selecting comprises:

denoting the lesser of the number of participants and the number of ideas in the plurality as p;

providing a Mian-Chowla number $a_n$, the Mian-Chowla number being the $n^{th}$ integer in the Mian-Chowla sequence;

forming a quantity $(2a_n-1)$;

solving for n to be the largest integer that satisfies $(2a_n-1) \geq p$; and setting the number of ideas per group to be n;

whereby the program is terminated or proceeds to subsequent rounds of redistributing ideas to further increase the accuracy of the method and whereby effectively a large number of ideas is distillable by a mass participant group.

\* \* \* \* \*